(12) United States Patent
Schmuck et al.

(10) Patent No.: US 8,075,998 B2
(45) Date of Patent: Dec. 13, 2011

(54) WATER-IN-OIL CREAMS OF ORGANOSILICON COMPOUNDS

(75) Inventors: Manfred Schmuck, Essen (DE); Roland Sucker, Werne (DE)

(73) Assignee: Evonik Goldschmidt GmbH, Essen (DE)

( * ) Notice: Subject to any disclaimer, the term of this patent is extended or adjusted under 35 U.S.C. 154(b) by 714 days.

(21) Appl. No.: 11/623,781

(22) Filed: Nov. 21, 2007

(65) Prior Publication Data

US 2008/0083349 A1    Apr. 10, 2008

Related U.S. Application Data

(63) Continuation of application No. 10/351,786, filed on Jan. 27, 2003, now abandoned.

(30) Foreign Application Priority Data

Jan. 29, 2002 (DE) .................................. 102 03 247

(51) Int. Cl.
*B08B 13/00*  (2006.01)
(52) U.S. Cl. .......................................... 428/405; 516/21
(58) Field of Classification Search .................. 428/405; 516/21
See application file for complete search history.

(56) References Cited

U.S. PATENT DOCUMENTS

| | | | |
|---|---|---|---|
| 5,091,002 | A | 2/1992 | Schamberg |
| 5,196,054 | A | 3/1993 | Schmuck |
| 5,962,585 | A | 10/1999 | Mayer |
| 2002/1003148 | | 3/2002 | Kenji et al. |

FOREIGN PATENT DOCUMENTS

| | | |
|---|---|---|
| DE | 39 11 479 C2 | 10/1991 |
| DE | 40 29 640 C2 | 9/1993 |
| DE | 196 28 035 A1 | 1/1998 |
| DE | 199 45 305 A1 | 1/2001 |
| EP | 0 819 665 B1 | 6/1999 |
| JP | 08-024616 | 1/1996 |

OTHER PUBLICATIONS

English translation of Hwang et al. J. of the Korean Ceramic Society, 37(8) (2000) 760-67.*
Kraitzer et al. "Paclitaxel-loaded composite filbers: Microstructure and emulsion stability" J. of Biomedical Materials Research Part A (2006) 427-436.*
Hwang et al., "The Emulsification of Silane as Water Repellent for Concrete," Jornal of the Korean Ceramic Society, vol. 37, No. 8, 760-67, 2000.

* cited by examiner

*Primary Examiner* — Kuo-Liang Peng
(74) *Attorney, Agent, or Firm* — Frommer Lawrence & Haug LLP

(57) ABSTRACT

The invention relates to hydrocarbon-free aqueous creams of organosilicon compounds, their preparation and their use. The hydrocarbon-free water-in-oil creams of organosilicon compounds comprise the components:

(A) one or more $C_1$-$C_{20}$-alkyl-$C_1$-$C_6$-alkoxysilanes (A1), alkoxy-containing organopolysiloxanes (A2) and/or organopolysiloxanes (A3) which comprise, in addition to other organosiloxane units, siloxane units which bear Si—C-bonded radicals containing basic nitrogen, with the proviso that the amine number of the organopolysiloxane is at least 0.01, (B) one or more emulsifiers and (C) water.

17 Claims, No Drawings

WATER-IN-OIL CREAMS OF ORGANOSILICON COMPOUNDS

RELATED APPLICATIONS

This application claims priority under 35 U.S.C. §119 to German application 102 03 247.5, filed Jan. 29, 2002, herein incorporated by reference.

BACKGROUND OF THE INVENTION

1. Field of the Invention

The invention relates to hydrocarbon-free aqueous creams of organosilicon compounds, their preparation and their use.

2. Description of the Related Art

Organosilicon compounds have been used for many years for the impregnation of inorganic and organic building materials in order to protect them against penetration of water. These silanes/siloxanes are employed as such, as solutions in solvents or in the form of emulsions. Aqueous hydrophilic emulsions of solvent-free organosilicon compounds are prior art and can be regarded as a substitute of equivalent value for solvent-based systems.

DE-A-199 45 305 relates to an impregnation cream for the waterproofing of building materials, which consists of a water-in-oil emulsion of hydrophobicizing organosilicon compounds, a nonactive hydrocarbon component, water, emulsifer and, if desired, auxiliaries and additives. The creams are prepared by blending two intermediate products in the form of creams. Hydrocarbons include, in particular, aliphatic and/or dearomatized petroleum spirit hydrocarbons, petroleum spirit hydrocarbons having from 9 to 12 carbon atoms and small proportions of aromatics, isoparaffinic hydrocarbons having from 11 to 15 carbon atoms and mixtures thereof.

EP-B-0 819 665 describes the preparation and use of an aqueous cream having a nonfluid consistency which penetrates into the building material after application and can be applied to the surfaces to be impregnated by blade coating and spraying. The cream-like consistency is based on the high active ingredient content of from about 65 to 90% by weight in the emulsion.

DE-C-40 29 640 describes the preparation of an emulsion having a low viscosity and a lower active ingredient content than that described in EP-B-0 819 665, which can be applied by rolling, spraying or flooding. The use concentration of this type of emulsions is generally 5-10%.

The emulsions described are water-dilutable oil-in-water systems (O/W).

However, these water-dilutable systems have a critical disadvantage. The application is very strongly influenced by the weather. If it starts to rain after application, the impregnated material is washed off from the exterior wall or washed out of the region close to the surface of the wall.

This applies particularly in the case of building protection systems which have a cream-like consistency and are applied in correspondingly high thicknesses. Since immediate penetration of the surface does not occur in the case of such systems, the cream remains on the building material surface before it is finally absorbed, so that this layer can be washed off more or less completely by rain and can get into the ground, which is ecologically and economically undesirable. Such an occurrence requires a second application.

Building protection emulsions having a low active content and a correspondingly low viscosity are washed out of the surface by rain after application. It is precisely in the region close to the surface where the water-repellent active ingredient should be located that impregnation has to be carried out again after rain.

Dong Hwang et al, Journal of the Korean Ceramic Society, Volume 37, No. 8, pp. 760 to 767, 2000, describe the emulsification of silanes as waterproofing agents for concrete. It is stated here that emulsions of silanes which require use of O/W and W/O emulsifiers are stabilized with the aid of polyvinyl alcohol (PVA).

OBJECT OF THE INVENTION

It is an object of the invention to find an environmentally friendly system which, firstly, penetrates well into a mineral or organic building material and, secondly, is rain-resistant immediately after application and is not washed off. Furthermore, a cream-like consistency is desired so as to prevent the composition running off vertical surfaces and ceilings which are to be impregnated. Cream-like emulsions also have the advantage that they do not form harmful aerosols on spray application. Creams can, inter alia, be applied to the surfaces to be impregnated by rolling, so that covering of, for example, windows becomes unnecessary.

SUMMARY OF THE INVENTION

This invention provides for, inter alia, a hydrocarbon-free water-in-oil cream of organosilicon compounds, which comprises the components (A) one or more alkyl-alkoxysilanes (A1), alkoxy-containing organopolysiloxanes (A2) and/or organopolysiloxanes (A3) which comprise, in addition to other organosiloxane units, siloxane units which bear Si—C-bonded radicals containing basic nitrogen, with the proviso that the amine number of the organopolysiloxane is about at least 0.01, (B) one or more emulsifiers and (C) water.

It has surprisingly been found that hydrocarbon-free W/O emulsions of silanes and/or polysiloxanes meet these requirements. This form of emulsion is rain-resistant immediately after application.

DETAILED DESCRIPTION OF THE INVENTION

The invention provides, in a first embodiment, hydrocarbon-free water-in-oil creams of organosilicon compounds, which comprise the components (A) one or more $C_1$-$C_{20}$-alkyl-$C_1$-$C_6$-alkoxysilanes (A1), alkoxy-containing organopolysiloxanes (A2) and/or organopolysiloxanes (A3) which comprise, in addition to other organosiloxane units, siloxane units which bear Si—C-bonded radicals containing basic nitrogen, with the proviso that the amine number of the organopolysiloxane is at least about 0.01, (B) one or more emulsifiers and (C) water.

An advantage of these novel emulsions is that they do not require an uneconomically high solids content in order to have a cream-like consistency. Owing to their freedom from hydrocarbons, penetration of the emulsions of the invention does not damage the environment.

For the purposes of the present invention, creams are paste-like, water-containing preparations which are emulsion systems comprising active ingredient, water and emulsifiers.

The aqueous creams of the invention penetrate completely into the building material. As a result, a water-repellent effect is obtained quickly after application. The aqueous creams are virtually solvent-free. The creams preferably contain no organic solvents such as hydrocarbons.

The aqueous creams are preferably nonfluid spreadable, sprayable and rollable, preferably colorless, coatings having a cream-like consistency.

The nonfluidity of the creams is defined as follows:

The cream is applied in a thickness of 1 mm by spraying or blade coating onto a vertical concrete or lime-sand brick surface. Nonfluidity then means that this cream descends by no more than 5 cm, preferably no more than 1 cm, particularly preferably not at all, after application before it is completely absorbed by the substrate.

The $C_1$-$C_{20}$-alkyl-$C_1$-$C_6$-alkoxysilanes (A1) preferably have 1 or 2 identical or different, unsubstituted or halogen-substituted, SiC-bonded monovalent $C_1$-$C_{20}$-alkyl radicals and the other radicals are identical or different $C_2$-$C_6$-alkoxy radicals.

Examples of $C_1$-$C_{20}$-alkyl radicals are the methyl, ethyl, n-propyl, isopropyl, n-butyl, isobutyl, tert-butyl, n-pentyl, isopentyl, neopentyl, tert pentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical and dodecyl radicals such as the n-dodecyl radical; cycloalkyl radicals such as cyclopentyl, cyclohexyl, 4-ethylcyclohexyl, cycloheptyl, norbornyl and methylcyclohexyl radicals.

Examples of halogen-substituted $C_1$-$C_{20}$-alkyl radicals are alkyl radicals substituted by fluorine, chlorine, bromine or iodine atoms, e.g. the 3,3,3-trifluoro-n-propyl radical, the 2,2,2,2',2',2'-hexafluoroisopropyl radical and the heptafluoroisopropyl radical.

Particular preference is given to unsubstituted $C_1$-$C_{12}$-alkyl radicals.

Examples Of $C_1$-$C_6$-alkoxy radicals are the methoxy, ethoxy, n-propoxy, isopropoxy, n-butyoxy, isobutoxy, sec-butoxy, tert-butoxy radicals; pentyloxy radicals such as the n-pentyloxy radical and hexyloxy radicals such as the n-hexyloxy radical. Ethoxy radicals are particularly preferred.

The alkoxy radicals can be substituted by halogen atoms, but this is not preferred.

The aqueous cream can contain one alkoxy-containing organopolysiloxane (A2) or a mixture of a plurality of organopolysiloxanes. The organopolysiloxanes (A2) can additionally contain hydroxyl groups which aid binding to the building materials, The organopolysiloxanes (A2) preferably have a viscosity of, for example, about 2000 mPa·s in order to achieve particularly good distribution on the pore surfaces in the wall. It is also possible to use relatively high viscosity organopolysiloxanes (A2) right up to solid resins, for example solid methylsilicone resins having a molar mass of from about 2000 to about 10,000 g/mol and, for example, a glass transition temperature 40-50° C. However, these have to be dissolved in the silanes before preparation of the creams of the invention.

Particularly useful organopolysiloxanes (A2) are organopolysiloxanes comprising units of the formula (I)

   (I)

where

R are identical or different monovalent, unsubstituted or halogen-substituted, SiC-bonded $C_1$-$C_{20}$-hydrocarbon radicals, $R^1$ are identical or different monovalent $C_1$-$C_6$-alkyl radicals, x is 0, 1, 2 or 3, on average from 0.8 to 1.8, y is 0, 1, 2 or 3, on average from 0.01 to 2.0, and z is 0, 1, 2 or 3, on average from 0.0 to 0.5, with the proviso that the sum of x, y and z is not more than 3.5.

The organopolysiloxane (A2) preferably has a viscosity of from about 10 mPa·s to about 50 000 mPa·s, in particular from about 50 mPa·s to about 5000 mPa·s, at 25° C.

Examples of $C_1$-$C_{20}$-hydrocarbon radicals are the $C_1$-$C_{20}$-alkyl radicals and halogen-substituted $C_1$-$C_{20}$-alkyl radicals listed above in the case of the organoalkoxysilanes, alkenyl radicals such as the vinyl, allyl, n-5-hexenyl, 4-vinylcyclohexyl and 3-norbornenyl radicals; aryl radicals such as the phenyl, biphenylyl, naphthyl, anthryl and phenanthryl radicals; alkaryl radicals such as o-, m-, p-tolyl radicals, xylyl radicals and ethylphenyl radicals; aralkyl radicals such as the benzyl radical and the alpha- and β-phenylethyl radicals. Particular preference is given to unsubstituted $C_1$-$C_{12}$-alkyl radicals and the phenyl radicals.

Although not indicated in the formula shown above, part of the radical R can be replaced by hydrogen atoms bound directly to silicon atoms. However, this is not preferred.

Examples of radicals $R^1$ are the methyl, ethyl, n-propyl, isopropyl, n-butyl, sec-butyl and tert-butyl radicals; pentyl radicals such as the n-pentyl radical and hexyl radicals such as the n-hexyl radical, with ethyl radicals being particularly preferred.

x preferably has an average value of from 0.9 to 1.1. y preferably has an average value of from 0.4 to 1.2. z preferably has an average value of from 0.0 to 0.2.

Examples of organosiloxanes (A2) are organosiloxanes which are obtainable by reaction of methyltrichlorosilane and, if desired, a $C_1$-$C_8$-alkyltrichlorosilane, or phenyltrichlorosilane with ethanol in water, e.g. the organopolysiloxanes of the empirical formulae

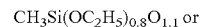

The organopolysiloxanes (A3) which may be used in addition to component (A2) are preferably organopolysiloxanes comprising units of the formula (II)

   (II)

where $R^2$ are identical or different monovalent, unsubstituted or halogen-substituted, SiC-bonded $C_1$-$C_{20}$-hydrocarbon radicals which are free of basic nitrogen, $R^3$ are identical or different monovalent, unsubstituted or halogen-substituted, SiC-bonded $C_1$-$C_{30}$-hydrocarbon radicals which contain basic nitrogen, $R^4$ may be identical or different and are each a hydrogen atom or a $C_1$-$C_6$-alkyl radical, a is 0, 1, 2 or 3, b is 0, 1, 2 or 3, on average at least 0.05 and c is 0, 1, 2 or 3, with the proviso that the sum of a, b and c is less than or equal to 3 and the amine number of the organopolysiloxane (A3) is at least 0.01.

The amine number is the number of ml of 1N HCl required to neutralize 1 g of organopolysiloxane (A3). The amine number of the organopolysiloxane (A3) is preferably at least about 0.1, in particular at least about 0.2, and preferably not more than about 8, in particular not more than about 4.

Examples and preferred examples of radicals $R^2$ have been given above in the case of the radical R. Particular preference is given to the methyl radical and the isooctyl radical.

It is preferred that each silicon atom to which a hydrogen atom is bound also bears a hydrocarbon radical, in particular a methyl radical.

The radical $R^3$ is preferably a radical of the formula (III)

$$R^5{}_2NR^6— \qquad (III),$$

where $R^5$ may be identical or different and are each hydrogen or a monovalent, substituted or unsubstituted $C_1$-$C_{10}$-hydrocarbon radical or $C_1$-$C_{10}$-aminohydrocarbon radical and $R^6$ is a divalent $C_1$-$C_{15}$-hydrocarbon radical.

Examples of radicals $R^5$ are the examples of hydrocarbon radicals given above for the radical R and also hydrocarbon radicals substituted by amino groups, e.g. aminoalkyl radicals, with particular preference being given to the aminoethyl radical.

Preference is given to at least one hydrogen atom being bound to each nitrogen atom in the radicals of the formula (III).

The radical $R^6$ is preferably a divalent hydrocarbon radical having from about 1 to 10 carbon atoms, particularly preferably from about 1 to 4 carbon atoms, in particular the n-propylene radical.

Examples of radicals $R^6$ are the methylene, ethylene, propylene, butylene, cyclohexylene, octadecylene, phenylene and butenylene radicals.

Preferred examples of radicals $R^3$ are
$H_2N(CH_2)_3—$,
$H_2N(CH_2)_2NH(CH_2)_2—$,
$H_2N(CH_2)_2NH(CH_2)_3—$,
$H_2N(CH_2)_2—$,
$H_3CNH(CH_2)_3—$,
$C_2H_5NH(CH_2)_3—$,
$H_3CNH(CH_2)_2—$,
$C_2H_5NH(CH_2)_2—$,
$H_2N(CH_2)_4—$,
$H_2N(CH_2)_5—$,
$H(NHCH_2CH_2)_3—$,
$C_4H_9NH(CH_2)_2NH(CH_2)_2—$,
cyclo-$C_6H_{11}NH(CH_2)_3—$,
cyclo-$C_6H_{11}NH(CH_2)_2—$,
$(CH_3)_2N(CH_2)_3—$,
$(CH_3)_2N(CH_2)_2—$,
$(C_2H_5)_2N(CH_2)_3—$ and
$(C_2H_5)_2N(CH_2)_2—$.

The examples of alkyl radicals $R^1$ all apply analogously to the radical $R^6$.

Examples and preferred examples of the radical $R^4$ are given above in the case of the radical $R^1$. Particular preference is given to the methyl and ethyl radicals.

The preferred average value of a is from 0 to 2, in particular from 0 to 1.8.

The preferred average value of b is from about 0.1 to 0.6, in particular from 0.15 to 0.30.

The preferred average value of c is from 0 to 0.8, in particular from 0.01 to 0.6.

The organopolysiloxanes (A3) preferably have a viscosity of from about 5 to about 5000 mPa·s, in particular from about 100 to about 3000 mPa·s, at 25° C.

Organopolysiloxanes (A3) can be prepared in a known manner, for example by equilibration or condensation of amino-functional silanes with organgpolysiloxanes (A2) which contain alkoxy groups and/or hydroxyl groups and are free of basic nitrogen.

The creams of the invention can further comprise hydrophobic solids having a large surface area, as are known, for example, from DE-A-39 11 479, in order to improve the water-repellent effect.

For the purposes of the present invention, the creams particularly preferably contain from about 5 to 100% by weight of $C_1$-$C_{20}$-alkyl-$C_1$-$C_6$-alkoxysilanes (A1), based on the amount of active ingredients (A1), (A2) and/or (A3).

In the same way, preference is given according to the invention to the organopolysiloxanes (A2) being present in an amount of from about 5 to 100% by weight, based on the amount of active ingredients (A1) and/or (A3).

In the same way, particular preference is given according to the invention to the organopolysiloxanes (A3) which comprise siloxane units containing basic nitrogen in addition to other organosiloxane units being present in an amount of from about 5 to 100% by weight, based on the amount of active ingredients (A1), (A2) and/or (A3).

The aqueous creams comprise at least one emulsifier known per se.

The amount of emulsifiers depends on the desired properties. For the purposes of the present invention, the creams particularly preferably contain from about 1 to about 40% by weight, more preferably from about 5 to about 20% by weight, of the emulsifiers, based on the amount of active ingredients (A2), (A2) and/or (A3).

It has been found that it is possible to obtain paste-like emulsions having active contents of from about 5 to about 50% by weight, preferably from about 20 to about 40% by weight, when suitable W/O emulsifiers are used. Suitable W/O emulsifiers generally have an HLB of from 2 to 5 and may be found among the following classes of substances: sorbitan esters, fatty alcohol ethoxylates, lanolin derivatives, fatty acid esters, glucose esters, emulsifiers based on polyglycerol or pentaerythritol and also organosiloxanes such as cetyl dimethicone copolyol.

The water-in-oil creams of the invention can be prepared by methods known per se from the prior art.

The waterproofing creams of the invention are preferably applied in a thickness of from about 0.1 mm to about 3 mm, in particular from about 0.2 mm to about 1.5 mm, particularly preferably from about 0.3 mm to about 1.1 mm.

Furthermore, the aqueous creams are suitable for waterproofing of mineral building materials, in particular for post-installation hydrophobicizing impregnation of natural or artificial stone, facing masonry, concrete, cement, lime-sand brick and porous concrete, building materials made from clay minerals, e.g. bricks, as waterproofing additive, which may also have a binding effect, to plaster of Paris, renders and in coatings for buildings, e.g. mineral paints, silicone resin emulsion paints and renders, paints containing dispersed silicate, emulsion paints, spreadable fillers, reinforcing compositions and primers. In particular, the early rain resistance of coating compositions for buildings is improved. The aqueous creams are thus also suitable for the treatment of organic building materials such as wood.

The aqueous creams are also suitable for hydrophobicizing finely divided inorganic materials such as perlite, vermiculite and thermal insulation materials.

EXAMPLES

Example 1

150 g of octyltriethoxysilane and 15 g of cetyl dimethicone polyol were placed in a 2 l glass beaker and 835 ml of water were added while stirring with a high-speed stirrer. The addition time was 10 minutes.

A stable cream had formed.

Example 2

250 g of a mixture consisting of 60% of octyltriethoxysilane and 40% of a reaction product of 93 g of α, ω-polysiloxanediol and 7 g of γ-aminopropyltriethoxysilane (cf. DE-C-40 29 640) and 25 g of emulsifier (cetyl dimethicone polyol) were placed in a glass beaker of the same size as in Example 1 and 725 g of water were added dropwise. As emulsifying apparatus, an Ultraturrax was used.

A stable cream was formed.

Example 3

200 g of an organopolysiloxane as described in DE-A-196 28 035, example on page 6, lines 60 to 64, comprising siloxane units which bear SiC-bonded radicals containing basic nitrogen were placed in a glass beaker of the same size as in Example 1. The amine number of the polysiloxane was at least 0.01. 20 g of emulsifier (sorbitan monooleate) were added to the initial charge, and 780 g of water were emulsified in with the aid of a Mizer disk. The addition of water took 20 minutes. A stable cream had formed.

Use Tests:

A) A lime-sand brick having dimensions of 7 cm×5 cm×2 cm was coated on all sides in the laboratory with the cream described in Example 2. The amount applied was 160 g/m², corresponding to about 40 g/m² of active ingredient. Immediately after coating had been carried out, the lime-sand brick was subjected to artificial rain. It was found that during the approximately 50 minute penetration time of the cream or the active ingredient therefrom, the water raining onto the surface was repelled as beads without washing off even tiny amounts of the cream. Even after the active ingredient of the cream had been completely absorbed the water was still repelled as beads.

After having been subjected to the artificial rain, the brick was stored at room temperature for 14 days and the water absorption was determined in accordance with DIN 52103.

Untreated lime-sand brick: 12.7%
Treated lime-sand brick: 0.9%
Reduction in the water absorption: 93%

B) A concrete cube having dimensions of 6 cm×6 cm×6 cm was impregnated on all sides with the cream described in Example 1. The amount of cream applied was 300 g/m², corresponding to an amount of active ingredient of 45 g/m². During the 60 minute penetration time, the coated concrete cube was subjected to artificial rain. No removal of the coating occurred.

After storage at room temperature for 14 days, the reduction in the water absorption was determined in accordance with DIN 52103.

| Concrete cube not impregnated | 6% water absorption |
| Concrete cube impregnated | 0.6% water absorption |
| Reduction in the water absorption | 90% |

C) A wooden cuboid having dimensions of 5 cm×7 cm×2 cm was coated with the cream from Example 3. The amount applied was 100 g/m², corresponding to an amount of active ingredient of 25 g/m². The treatment with artificial rain carried out subsequently removed no emulsion.

After storage at room temperature for 14 days, the water absorption was determined in accordance with ASTM D 5401.

Reduction in the water absorption 84%

COMPARATIVE EXAMPLE

An impregnation cream was prepared as described in DE-199 45 305, Example 1. Based on the total composition, 40% by weight of an isoparaffinic hydrocarbon mixture having a boiling range from 185 to 213° C. and a flashpoint of above 60° C. and 40% by weight of a 1:1 mixture of an alkylalkoxysilane and an alkylalkoxysiloxane were combined and homogenized. 19.3% by weight of water and 0.7% by weight of emulsifier Marlipal® were subsequently added a little at a time and emulsification was carried out in a customary manner until a cream-like consistency had been obtained. The inert cream was thus ready to apply.

The emulsifier Marlipal® contained 9 EO units (HLB=13.7). After application to a mineral substrate, the cream could be rinsed off completely with water (rain). It was clearly an O/W emulsion.

The above description is intended to be illustrative and not limiting. Various changes or modifications in the embodiments described herein may occur to those skilled in the art. These changes can be made without departing from the scope or spirit of the invention.

The invention claimed is:

1. A method for waterproofing building materials which comprises applying a hydrocarbon-free water-in-oil cream of organosilicon compounds, which comprises the components (A) at least one or more optionally halogen-substituted alkyl-alkoxysilanes (A1); and/or one or more organopolysiloxanes (A3) which comprise, in addition to other organosiloxane units, siloxane units which bear Si—C-bonded radicals containing basic nitrogen, with the proviso that the amine number of the organopolysiloxane is at least about 0.01; and optionally an alkoxy containing polysiloxane (A2);

(B) one or more emulsifiers and (C) water;

to said building materials.

2. The method of waterproofing building materials of claim 1, wherein the alkoxy-containing organopolysiloxanes (A2) comprise units of the formula (I)

$$R_x Si(OR^1)_y Si(OH)_z O_{\frac{4-x-y-z}{2}} \quad (I)$$

where

R are identical or different monovalent, unsubstituted or halogen-substituted, SiC-bonded $C_1$-$C_{20}$-hydrocarbon radicals, $R^1$ are identical or different monovalent $C_1$-$C_6$-alkyl radicals, x is 0, 1, 2 or 3, on average from 0.8 to 1.8, y is 0, 1, 2 or 3, on average from 0.01 to 2.0, and z is 0, 1, 2 or 3, on average from 0.0 to 0.5, with the proviso that the sum of x, y and z is not more than 3.5.

3. A method for waterproofing building materials which comprises applying to said building materials a hydrocarbon-free water-in-oil cream of organosilicon compounds, which comprises the components (A) at least one or more optionally halogen-substituted $C_1$-$C_{20}$-alkyl-$C_1$-$C_6$-alkoxysilanes (A1); and/or one or more organopolysiloxanes (A3) which comprise, in addition to other organosiloxane units, siloxane units which bear Si—C-bonded radicals containing basic nitrogen, with the proviso that the amine number of the organopolysiloxane is at least 0.01;

and optionally an alkoxy containing polysiloxane (A2);

(B) one or more emulsifiers and (C) water.

4. The method of waterproofing building materials of claim 3, wherein the $C_1$-$C_{20}$-alkyl-$C_1$-$C_6$-alkoxysilanes (A1) have 1 or 2 identical or different, unsubstituted or halogen-substituted, SiC-bonded monovalent $C_1$-$C_{20}$-alkyl radicals and the other radicals are identical or different $C_2$-$C_6$-alkoxy radicals.

5. The method of waterproofing building materials of claim 3, wherein the $C_1$-$C_{20}$-alkyl-$C_1$-$C_6$-alkoxysilanes (A1) are present in an amount of from about 5 to 100% by weight, based on the amount of active ingredients (A1) and (A3).

6. The method of waterproofing building materials of claim 3, wherein the alkoxy-containing organopolysiloxanes (A2) are present in an amount of from about 5 to 100% by weight, based on the amount of active ingredients (A1) and (A3).

7. The method of waterproofing building materials of claim 3, wherein the organopolysiloxanes (A3) which comprise, in addition to other organosiloxane units, siloxane units comprising units of the formula (II)

where

R² are identical or different monovalent, unsubstituted or halogen-substituted, SiC-bonded $C_1$-$C_{20}$-hydrocarbon radicals which are free of basic nitrogen, R³ are identical or different monovalent, unsubstituted or halogen-substituted, SiC-bonded $C_1$-$C_{30}$-hydrocarbon radicals which contain basic nitrogen, R⁴ may be identical or different and are each a hydrogen atom or a $C_1$-$C_6$-alkyl radical, a is 0, 1, 2 or 3, b is 0, 1, 2 or 3, on average at least 0.05, and c is 0, 1, 2 or 3, with the proviso that the sum of a, b and c is less than or equal to 3.

8. The method of waterproofing building materials of claim 3, wherein the organopolysiloxanes (A3) which comprise, in addition to other organosiloxane units, siloxane units containing basic nitrogen are present in an amount of from about 5 to 100% by weight, based on the amount of active ingredients (A1), (A2) and (A3).

9. The method of waterproofing building materials of claim 3, wherein the emulsifiers (B) have an HLB of from about 2 to 5.

10. The method of waterproofing building materials of claim 3, wherein the emulsifiers (B) are selected from the group consisting of sorbitan esters, fatty alcohol ethoxylates, lanolin derivatives, fatty acid esters, glucose esters and emulsifiers based on polyglycerol or pentaerythritol.

11. The method of waterproofing building materials of claim 3, wherein the emulsifier is cetyl dimethicone copolyol.

12. The method of waterproofing building materials of claim 3, wherein the emulsifiers (B) are present in an amount of from about 1 to about 40% by weight, based on the amount of active ingredients (A1), (A2) and (A3).

13. The method of waterproofing building materials of claim 3, wherein the emulsifiers (B) are present in an amount from about 5 to about 40% by weight, based upon the amount of active ingredients (A1), (A2) and (A3).

14. The method of waterproofing building materials of claim 3, wherein the amount of the components (A)+(B) is from about 5 to about 50% by weight, based upon total weight of the cream.

15. The method of waterproofing building materials of claim 3, wherein the amount of the components (A) and (B) is from 20 to 40% by weight, based upon total weight of the cream.

16. A process for hydrophobing finely divided inorganic materials which comprises contacting a hydrocarbon-free water-in-oil cream of organosilicon compounds, which comprises the components (A) at least one or more optionally halogen-substituted alkyl-alkoxysilanes (A1); and/or one or more organopolysiloxanes (A3) which comprise, in addition to other organosiloxane units, siloxane units which bear Si—C-bonded radicals containing basic nitrogen, with the proviso that the amine number of the organopolysiloxane is at least about 0.01; and optionally an alkoxy containing polysiloxane (A2);

(B) one or more emulsifiers and (C) water;

with said inorganic materials.

17. The process according to claim 16 wherein the finely divided inorganic materials are perlite, vermiculite, or a thermal insulation material.

* * * * *